F. R. CARPENTER.
PROCESS OF OBTAINING SULFUR, &c., FROM FURNACE GASES.
APPLICATION FILED MAR. 17, 1906.
925,751.
Patented June 22, 1909.
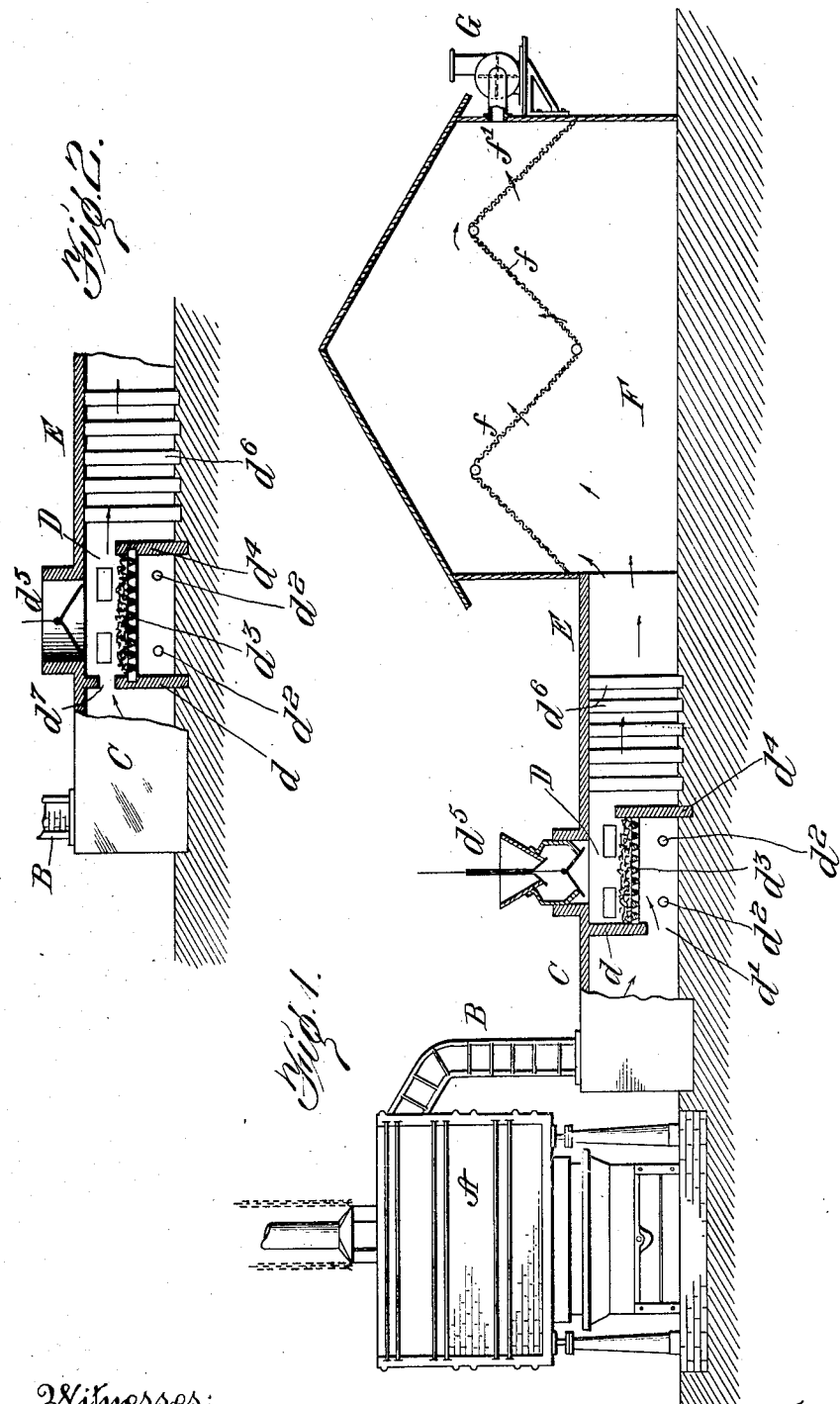
Witnesses:
Paul J. Gathmann
E. B. Bruner.
Inventor
F. R. Carpenter
By his Attorneys:
Baldwin & Wight

UNITED STATES PATENT OFFICE.

FRANKLIN R. CARPENTER, OF DENVER, COLORADO, ASSIGNOR, BY DIRECT AND MESNE ASSIGNMENTS, TO THE AMERICAN IRON AND STEEL ALLOYS COMPANY, A CORPORATION OF COLORADO.

PROCESS OF OBTAINING SULFUR, &c., FROM FURNACE-GASES.

No. 925,751. Specification of Letters Patent. Patented June 22, 1909.

Application filed March 17, 1906. Serial No. 306,691.

*To all whom it may concern:*

Be it known that I, FRANKLIN R. CARPENTER, a citizen of the United States, residing in Denver, in the county of Denver and State of Colorado, have invented a new and useful Process of Obtaining Sulfur and other Substances from Furnace and other Gases, of which the following is a specification.

In the calcining, roasting and smelting of sulfid ores, and especially in the raw or pyritic smelting process, vast quantities of sulfurous and other gases are evolved and discharged into the atmosphere where they are not only lost, but become very injurious to animal and vegetable life. These gases cannot, from their nature, be settled out from the other fumes in a dust chamber or filtered out in a bag house, or such other filtering devices. This is because they are gases and not solids. Reduced to solids their escape into the atmosphere may be prevented and they may be saved for further use in the arts.

According to my invention I pass such gases through a reducing atmosphere,—as through or over a bed of glowing coke or other fuel, whereby some of them are reduced to solid substances which after cooling can be settled out in a settling chamber or filtered out in a bag house or other suitable means for separating solids from gases. Thus the gases from a furnace in which sulfid ores are roasted or smelted may be passed through a reducing atmosphere whereby the sulfurous gases are reduced to sulfur which latter after cooling becomes solid and is then settled out in a settling chamber and filtered out in a bag house or other suitable filter. By passing these gases through or over beds of glowing coke or other similar substances sulfurous acid especially, along with such other gaseous substances that may be reduced by carbon will, upon cooling, become solids and may be filtered out as above described, while the carbonic acid, nitrogen, etc., are unaffected and pass on through the settling chamber and through the filtering means, but the sulfur and other solids which have been reduced from the fumes will either settle in the settling chamber or be caught in the filtering compartment or compartments of the plant. This could not be done when the substances are in a gaseous state.

In the accompanying drawing, Figure 1 is a diagram illustrating an apparatus which may be employed in carrying out my process. Fig. 2 illustrates a modification.

A, represents any ordinary furnace. As shown it is represented as a blast furnace, such as is commonly used for smelting pyritic ores.

B is a down-comer leading to a dust chamber, C.

D is a reducing chamber located at the end of the dust chamber. The reducing chamber, D, is of substantially the form and size in cross section as the dust chamber from which it is partially separated by a wall, $d$, through which there is an opening, $d'$. Extending rearwardly from the wall $d$, is a furnace grate, $d^3$, of ordinary construction which extends the full width of the chamber and rearwardly to another wall, $d^4$. This furnace grate is adapted to support a bed of incandescent coke which may be fed thereto from an ordinary bell-hopper, $d^5$. Beneath the grate is located a twyer or twyeres, $d^2$, to be used from time to time as necessary to maintain the coke incandescent, and an outlet through which ash may be removed may be provided. Beyond the wall, $d^4$, are checkerwork partitions, $d^6$, of fire-brick. From the reducing chamber a continuation of structure forms a passage, E, of any desired length leading to a settling chamber, F. The settling chamber, F, is provided with any suitable or desired filter. As shown the filter is formed of a cloth, $f$, arranged in a zigzag fashion across the chamber, the passage, E, communicating with the chamber below the filter cloth while the outlet, $f'$, to the chamber is located above it, and the latter is connected with an exhaust fan, G.

As shown in Fig. 1 the furnace gases are conducted from the dust chamber, C, to the reducing chamber, D, by an opening, $d'$, by which they are conducted beneath the grate, but in Fig. 2 I have shown an opening, $d^7$, communicating with the space above the grate.

In carrying out my process, when dealing with gases issuing from furnaces for calcining, smelting or roasting sulfid ores, the furnace gases coming from the furnace, A, and containing sulfurous oxid ($SO_2$) are conducted directly to the dust chamber, C, in which is deposited the solid particles carried mechanically by the gases. From the dust chamber the gases are conducted through a reducing atmosphere as through or over incandescent carbon in the reducing chamber, D, by which the sulfurous oxid is reduced. The hot gases coming from the incandescent carbon will heat the checkered work, $d^6$, through which they pass, to a high temperature and as the gases pass through them any subsidiary sulfids formed will be decomposed. In the passage leading to the settling chamber, F, the gases will be cooled and sulfur, formed by the reduction of the sulfurous oxid, will be condensed and may be deposited to some extent, but generally it will be found that the sulfur is carried along into the settling chamber and it is filtered out of the remaining gases by the cloth, $f$, said gases being discharged through the exhaust fan, G.

It will be seen that by my process I not only remove from furnace gases a deleterious body, but also by the same operation I obtain a product which has commercial value.

It would be impracticable to collect the sulfurous oxid as such at the place where the roasting and smelting is done and then transport it to a place where it can be sold, and the same would be the case if transformed into sulfuric acid, but by reducing the sulfurous oxid to sulfur it is reduced to a smaller bulk and easily transported, and can be subsequently used as such or converted into other things.

While I have described the process as applied to gases coming directly from a furnace, it is obvious that the sulfurous oxid might be concentrated before it is brought into contact with the incandescent carbon.

While I have described the process as especially applied to the reduction of sulfurous oxid and the collection of sulfur obtained therefrom, the process may be employed for the reduction of other oxids which occur in furnace or other gases.

I claim:—

1. The process of purifying furnace gases and obtaining values therefrom which consists in separating from the gases solid particles mechanically carried over with them, reducing the sulfur gases by passing them through a reducing atmosphere, causing the reduced gases to be further heated to reduce subsidiary sulfids, condensing the reduced sulfur by cooling the reduced gases and finally separating the sulfur from these gases.

2. The process of purifying furnace gases which consists in first separating from such gases the solid particles mechanically carried over with them, reducing the sulfur gases by passing them through or over glowing carbon, from time to time admitting air to raise the carbon to incandescence, causing the reduced gases to be further heated to reduce subsidiary sulfids, condensing the reduced sulfur by cooling the reduced gases, and finally separating the sulfur from these gases.

In testimony whereof, I have hereunto subscribed my name.

F. R. CARPENTER.

Witnesses:
  LLOYD B. WIGHT,
  WM. D. BALDWIN.